Hall & Stewart,
Sawing Shingles,
N° 20,876. Patented July 13, 1858.
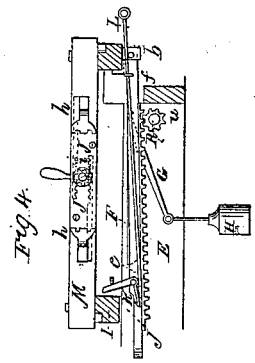
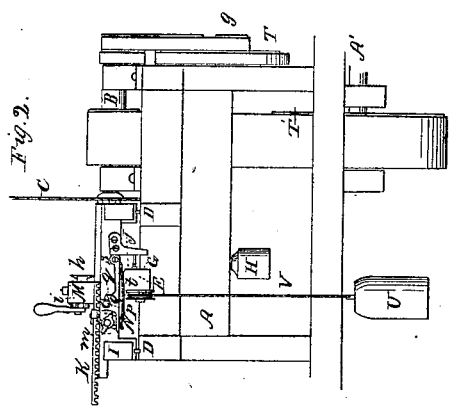
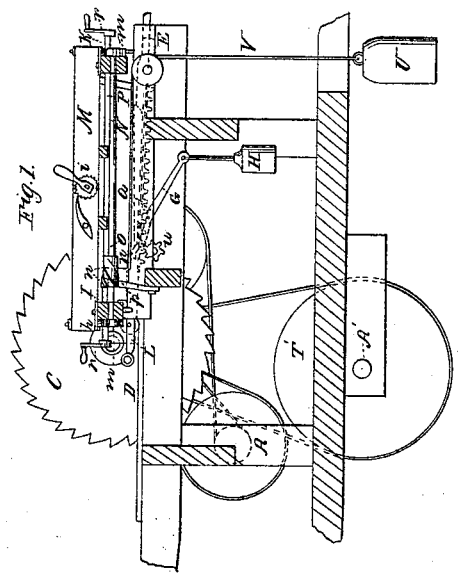
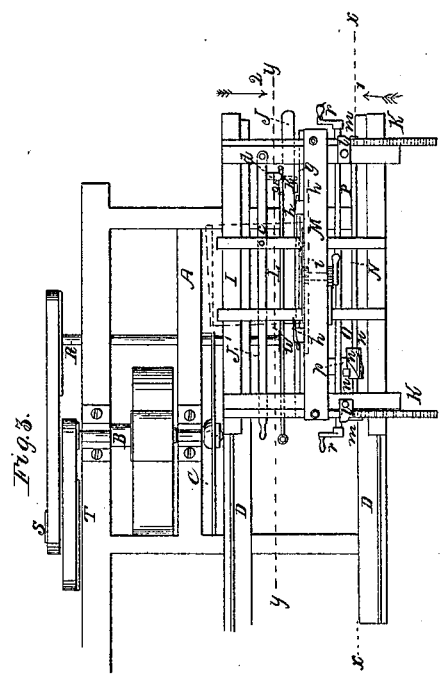

UNITED STATES PATENT OFFICE.

E. HALL AND J. F. STEWART, OF EAST RANDOLPH, NEW YORK.

SHINGLE-MACHINE.

Specification of Letters Patent No. 20,876, dated July 13, 1858.

*To all whom it may concern:*

Be it known that we, ERASTUS HALL and JOEL F. STEWART, of East Randolph, in the county of Cattaraugus and State of New York, have invented a new and useful Improvement in Shingle-Machines; and we do hereby declare that the following is a full, clear, and exact description of the same, reference being had to the annexed drawings, making a part of this specification, in which—

Figure 1, is a side sectional elevation of an improvement taken in the line $x, x$, Fig. 3, and looking in the direction indicated by arrow 1. Fig. 2, is an end view of ditto. Fig. 3, is a plan or top view of ditto. Fig. 4, is a detached longitudinal view of the carriage and a portion of the upper part of the framing.

Similar letters of reference indicate corresponding parts in the several figures.

This invention relates to an improvement in that class of shingle machines in which a circular saw is used for sawing the shingles from the bolt. The invention consists in the peculiar means employed for feeding and setting the bolt to the saw, as hereinafter fully shown and described, whereby the machine is rendered automatic in its operation, or in other words, the bolt when applied or adjusted to the carriage and the machine put in operation, is by a continuous operation without attendance, sawed into shingles of proper taper form.

To enable those skilled in the art to fully understand and construct our invention we will proceed to describe it.

A, represents a rectangular framing on the upper part of which a saw arbor B, is placed.

C, is the circular saw placed on the mandrel.

D, D, are the ways or guides which are placed longitudinally on the frame A, and at right angles with arbor B.

E, is a bar which is placed between the ways or guides D, D, and parallel with them. To one side of this bar an inclined or taper plate F, is attached, and directly below this plate F, and to the same bar E, a lever G, is attached by a fulcrum pin $a$. One end of this lever has a weight H, attached to it, and is curved or rounded, see dotted lines Figs. 1 and 4.

I, is a carriage which is merely a rectangular frame fitted on the ways or guides D, D, and allowed to slide freely thereon. To the under side of this carriage the front end of a rack J, is hinged, as shown at $b$.

J', is a lever, which is placed in the carriage I, and works horizontally on a fulcrum pin $c$. This lever has a short horizontal plate $d$, attached to it at right angles, said plate retaining, when placed in one position, the back end of the rack J, in consequence of said plate catching into a recess or notch in a bent lever K, which is attached to the rack J, by a pivot $e$.

L, is a sliding rod which is fitted in a guide at one side of the rack J, and the rod is bent at one end and passes horizontally through a slot made in the rack J, the end of the rod projecting a short distance beyond the side of the rack J, as shown at $g$, Fig. 3. A projection $h$, is attached to one side of the rack J, the same side at which the end $g$, of the rod L, presents itself. The bent end of the rod L, passes through an oblong slot in the rack so that the rod may be moved or adjusted back and forth thereon.

M, is a bar which is placed longitudinally on the carriage I. This bar has a clamp fitted to it, said clamp being formed of two dogs $h, h$, which are operated or adjusted by a pinion $i$, and two racks $j, j$, see Fig. 4. To each end of the bar M, a rack $k$, is attached. These racks work in guides $l$, attached to the ends of the carriage.

In the carriage I, a longitudinal shaft N, is placed, and on each end of this shaft a wiper $m$, is placed. These wipers are simple wheels or circular disks having each two teeth formed on their peripheries at opposite points of their centers, see Fig. 2. The teeth of one wiper is placed in an opposite position relatively with the teeth of the other. These wipers gear or actuate the racks $k$, and consequently the bar M, and as the teeth of one rack are placed in an opposite position relatively with those of the other the racks will be actuated alternately.

On the shaft N, a cylindrical hub or boss O, is placed. This hub or boss has a series of spiral flanches $n$, formed on it as shown clearly in Fig. 3.

To the upper part of the framing A, a vertical spring catch $p$, is attached, which is so placed as to catch over or on the spiral projections $n$, on the hub or boss O, as the latter passes it.

P, is a shaft which is fitted in the carriage

I, and has a tooth or spur q, on each end. This shaft is provided with a crank r, at each end, and by operating it the bar M, may be gigged back when necessary.

To each end of the carriage I, a plate Q, is pivoted, as shown at s. These plates have each a spring t, bearing against their under sides and the plates bear against the wipers m, preventing the same from moving casually.

R, is a shaft which is fitted in the framing A, and has a pinion u, on its inner end. The shaft R, is driven by a belt from the pulley S, and the mandrel B, is driven by a belt from a pulley T', which is attached to a shaft A', which is rotated from the driving shaft. From the mandrel B, the pulley S, is rotated by a belt which passes around a pulley T, attached to pulley S.

U, is a weight which has a cord V, attached to it. The cord V, is attached to the front end of the carriage I.

The operation is as follows: The bolt, shown in red is secured to the bar M, on the carriage I, and motion is given the pulleys S, T, in any proper way. The carriage I, is fed forward toward the saw C, in consequence of the pinion u, gearing into the rack J. When the carriage I, has reached the end of its forward stroke, the end g, of the rod L, and rack J, will be thrown up in front of and upon the upper part of plate F, by the lever G, actuated by the weight H, and the rack being thereby freed from the pinion u, the weight U, will draw the carriage back and when the projection h, has passed off the upper surface of the plate F, the rack J, falls and gears into pinion u, which again feeds the carriage forward the motion of the pinion u, being continuous. The length of the stroke or movement of the carriage I, may be regulated by adjusting the rod L, and thereby varying the position of the end g, of the rod L. The rack may also when necessary be entirely raised free from the pinion by adjusting said rod. By the means above described the bolt is thus fed to the saw and gigged back. The bolt is fed to the saw in this way and each time the carriage I, is drawn back by the weight U, the spring catch p, will rotate the shaft N, a certain distance in consequence of catching on the spiral projections n, and as the wipers m, are placed in reverse positions on the shaft N, the ends of the bar M, and consequently the bolt will be moved alternately toward the saw at the commencement of each forward movement of the carriage and the shingles will consequently be sawed from the bolt in proper taper form.

Having thus described our invention what we claim as new and desire to secure by Letters Patent, is,

The rack J, pivoted to the carriage I, in combination with the rod L, plate F, pinion u, and lever G, with weight H, attached, the parts being arranged as shown for the purpose of feeding the bolt to the saw, and gigging back the same automatically as shown.

We also claim setting the bolt to the saw, by means of the bar M, provided with the racks k, k, operated by the backward movement of the carriage through the medium of the wipers m, m, and boss or hub O, on shaft N, provided with spiral ledges n, and the spring catch p, the parts being arranged to operate conjointly and automatically with the carriage I, as described.

ERASTUS HALL.
JOEL F. STEWART.

Witnesses:
E. HOLDRIDGE,
M. F. JENKINS.